(12) United States Patent
Andersen (10) Patent No.: US 7,624,048 B2
(45) Date of Patent: Nov. 24, 2009

(54) CONTROLLING PRODUCT INFORMATION IN A VIRTUAL PRODUCT SHOWROOM

(75) Inventor: Jan Andersen, Minnetonka, MN (US)

(73) Assignee: Bellacor.com, Inc., Mendota Heights, MN (US)

( * ) Notice: Subject to any disclaimer, the term of this patent is extended or adjusted under 35 U.S.C. 154(b) by 781 days.

(21) Appl. No.: 11/348,833

(22) Filed: Feb. 7, 2006

(65) Prior Publication Data
US 2007/0185784 A1 Aug. 9, 2007

(51) Int. Cl.
G06F 17/30 (2006.01)
(52) U.S. Cl. ...................................... 705/27
(58) Field of Classification Search ................ 705/27
See application file for complete search history.

(56) References Cited

U.S. PATENT DOCUMENTS

| | | | |
|---|---|---|---|
| 6,694,300 B1 | 2/2004 | Walker et al. | |
| 6,842,755 B2 | 1/2005 | Maslov | |
| 6,952,705 B2 * | 10/2005 | Knoblock et al. | 707/103 R |
| 6,954,734 B1 * | 10/2005 | Kuelbs et al. | 705/26 |
| 6,970,832 B1 * | 11/2005 | Dean et al. | 705/14 |
| 7,197,479 B1 * | 3/2007 | Franciscus de Heer et al. | 705/27 |
| 7,356,327 B2 * | 4/2008 | Cai et al. | 455/406 |
| 2001/0007991 A1 | 7/2001 | Tobin | |
| 2002/0010645 A1 | 1/2002 | Hagen et al. | |
| 2002/0010651 A1 | 1/2002 | Cohn et al. | |
| 2002/0072984 A1 | 6/2002 | Rothman et al. | |
| 2002/0188527 A1 * | 12/2002 | Dillard et al. | 705/27 |
| 2003/0009392 A1 | 1/2003 | Perkowski | |
| 2003/0033205 A1 | 2/2003 | Nowers et al. | |
| 2003/0093321 A1 | 5/2003 | Bodmer et al. | |
| 2004/0010456 A1 | 1/2004 | Hoang | |

* cited by examiner

Primary Examiner—Ramsey Refai
(74) Attorney, Agent, or Firm—Brooks, Cameron & Huebsch, PLLC (57) ABSTRACT

Methods, computer readable media, and systems including program instructions are provided for use with virtual product showrooms. A method embodiment includes providing a website with product information for a number of products offered by a distributor to a reseller. The embodiment also includes receiving a price control input, for a particular product from among the number of products, from the reseller, through the website. The embodiment further includes displaying product information, for the particular product, on the website, to a potential purchaser, based on the price control input.

8 Claims, 10 Drawing Sheets

Set The Markup Options For All Locations

(fill in as many or as few as you like)

Current Markup Options Available

1.3    [Delete]

1.4    [Delete]

1.5    [Delete]

[submit/continue]

Add New Markup Options

Markup Option 1  [1.6]  ~844

Markup Option 2  [1.7]

Markup Option 3  [1.8]

Markup Option 4  [   ]

Markup Option 5  [   ]

Markup Option 6  [   ]

Markup Option 7  [   ]

Markup Option 8  [   ]

Markup Option 9  [   ]

Markup Option 10 [   ]

[submit]

*Fig. 8*

CONTROLLING PRODUCT INFORMATION IN A VIRTUAL PRODUCT SHOWROOM

BACKGROUND

In the field of electronic commerce, businesses and individuals can purchase and sell products using various electronic media, such as the Internet. Businesses use electronic media to sell products to individual purchasers and to other businesses. In some business arrangements, a distributor may offer a product for sale to a reseller, which may in turn offer that product for resale under the reseller's private label to a potential purchaser. When a reseller offers a distributor's products for resale under a private label, the distributor and the reseller can often realize sales that might otherwise be lost to other businesses.

Electronic media are useful for providing product information about products for sale. For example, a potential purchaser can often obtain product information from an Internet website of a business selling the product. However, providing product information through electronic media can present some difficulties for businesses.

For some businesses, traditional methods of providing product information through electronic media do not provide them with sufficient control over their display of product information. If a business does not have sufficient control over its display of product information then a potential purchaser can "price shop" that business. For example, if a business displays product information on a website, and that product information includes manufacturer information and price information, then potential purchasers can use the manufacturer information to shop for that product at other businesses, seeking a lower price. In price shopping, a business that introduces products to potential purchasers risks losing sales to other businesses.

A business that does not have sufficient control over its display of product information through electronic media can also encounter various other difficulties. If a business does not control the display of price information for a product, then the business may have difficulty encouraging potential purchasers to focus on the product's features rather than the product's price. Further, if a business does not control the display of price information for a product, then the business may not be able to display different prices in different locations, to account for local market conditions. In addition to price information, a business may also encounter various difficulties, if it does not have sufficient control over its display of other product information, such as product names, descriptions, numbers, pictures, product availability, etc.

DETAILED DESCRIPTION

Embodiments of the present disclosure include methods, computer readable media, and systems including program instructions for use in controlling product information. A method embodiment includes providing a website with product information for a number of products offered by a distributor to a reseller. The embodiment also includes receiving a price control input, for a particular product from among the number of products, from the reseller, through the website. The embodiment further includes displaying product information, for the particular product, on the website, to a potential purchaser, based on the price control input. Embodiments of the present disclosure can be performed by software, firmware, hardware, application modules, and the like. These embodiments can use program instructions resident on and/or executable by ASICs, devices, systems, or networks shown herein or otherwise. The embodiments of the present disclosure are not limited to any particular operating environment or to instructions written in any particular programming language. Software, firmware, and/or processing modules, suitable for carrying out embodiments of the present disclosure, can be resident on one or more devices or in one or more locations.

Figure 1:
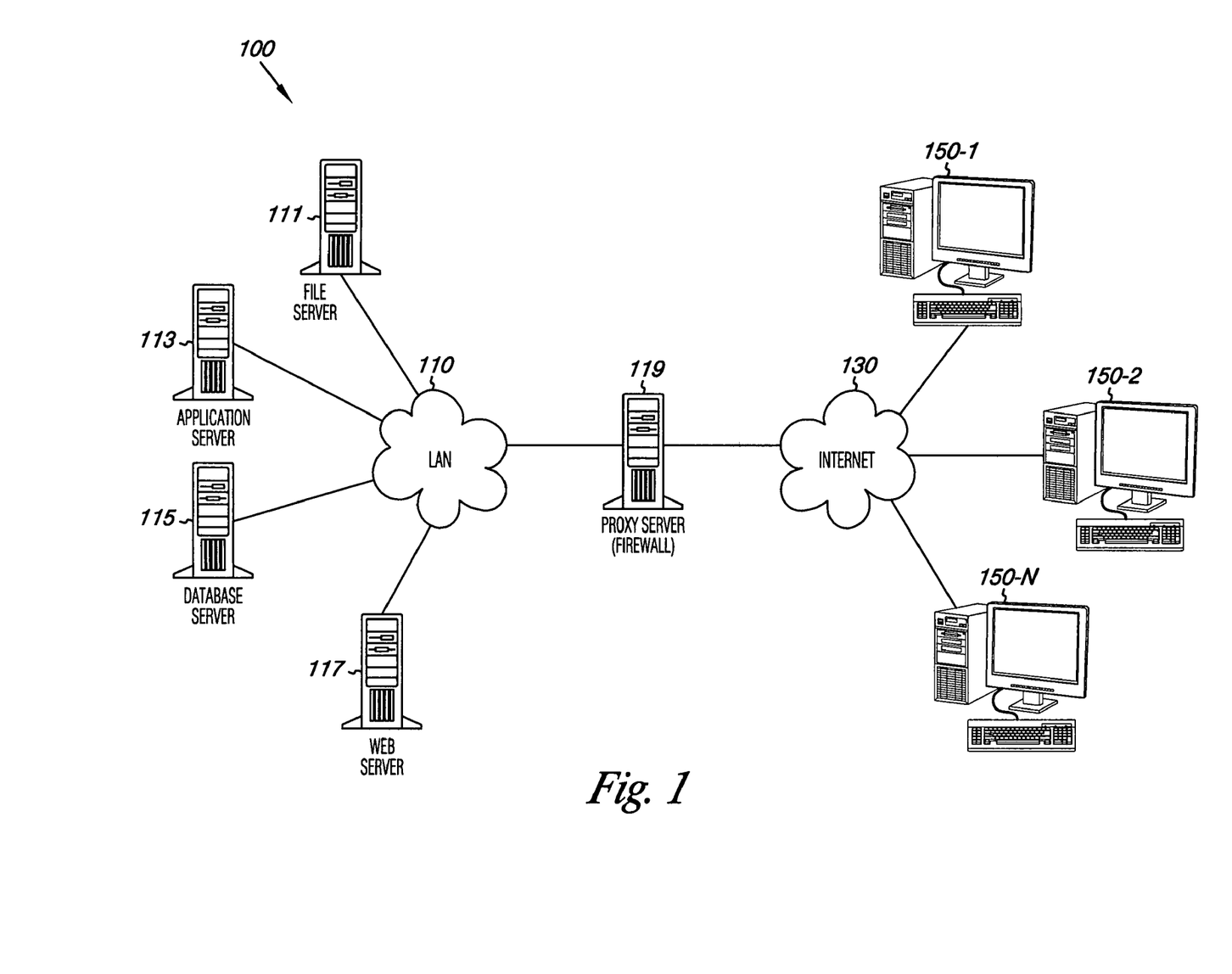
FIG. 1 illustrates an exemplary computing network suitable for implementing embodiments of the present disclosure.

FIG. 1 illustrates an exemplary computing network 100 suitable for implementing embodiments of the present disclosure. A number of network devices, e.g. personal computers, servers, computing peripherals, etc., can be networked together via a local area network (LAN) 150. Network devices can also be networked together via other kinds of networks. The embodiment of FIG. 1 illustrates a number of servers networked together through the LAN 150.

The servers connected together through the LAN 150 include a file server 111, an application server 113, a database server 115, a web server 117, and a proxy server 119. A LAN can also include various other servers. The file server 111 can store various files and can provide access to those files through the LAN 110. The application server 113 can store various program applications with various program instructions (e.g., computer executable instructions) which can be executable over the LAN 110. The database server 115 can store various databases and can provide access to those databases through the LAN 110. For example, the database server 115 can store a database with product information for a number of products, as described in connection with FIG. 2. The web server 117 can provide various services associated with the Internet's World Wide Web. For example, the web server 117 can store one or more web pages having product information for a number of products, e.g., as described in connection with FIGS. 3-8. The proxy server 119 can connect the LAN 110 to the Internet 130 and can serve as a firewall between them.

A number of computing devices can also connect to the Internet 130. FIG. 1 shows computing devices 150-1, 150-2, . . . , 150-N. The designator "N" is intended to represent that a number of computing devices can be connected to the Internet. Computing devices can connect to the Internet 130 in various ways, such as through dial-up connections, cable lines, DSL lines, through other networks, etc. Computing devices can access various information such as information contained in one or more web pages associated with a website, through the Internet. According to various embodiments, businesses or individuals can use computing devices to access a controlled display of product information, as described in connection with FIG. 2.

Figure 2:
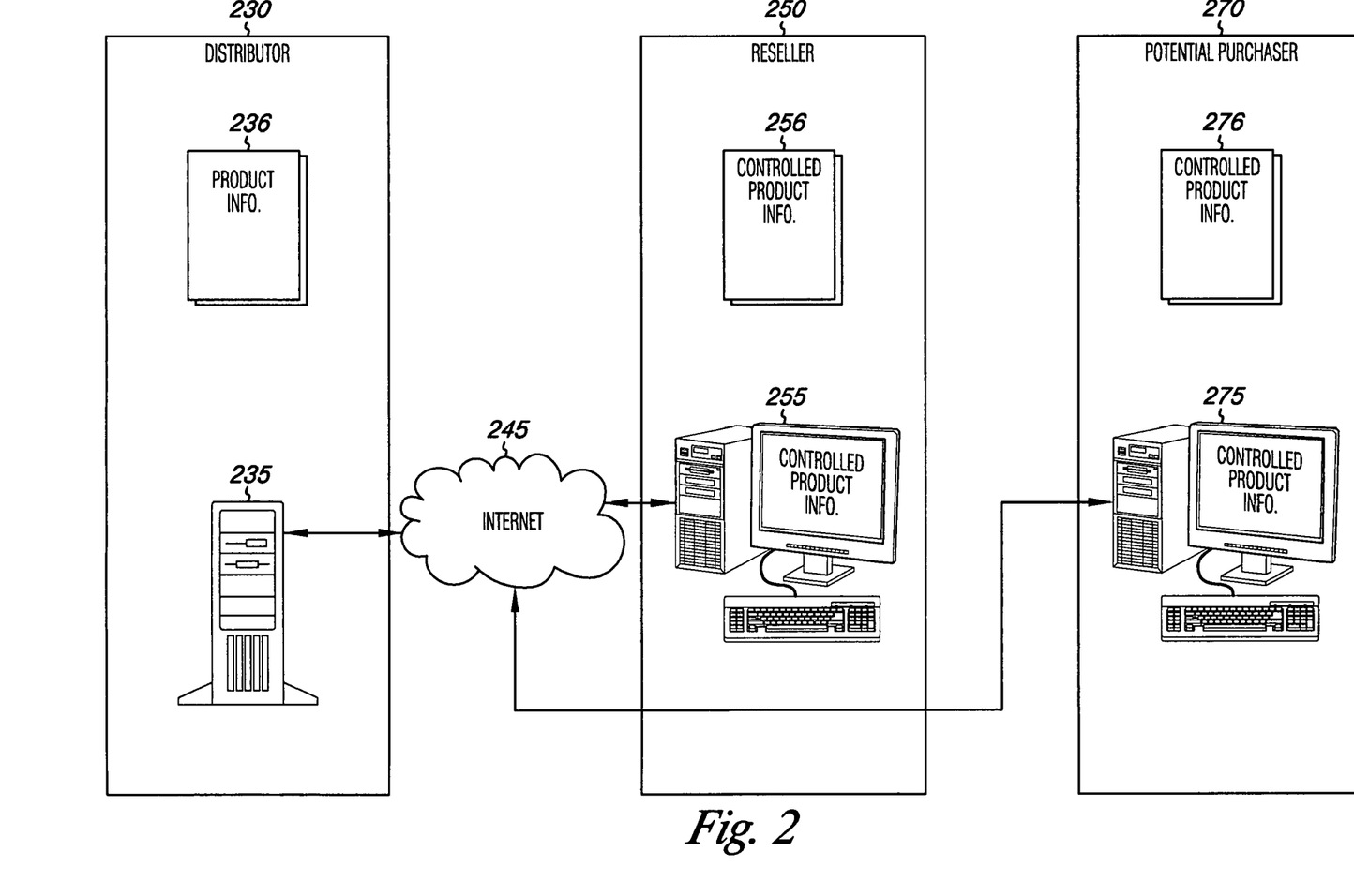
FIG. 2 illustrates an embodiment of a method for controlling product information according to the present disclosure.

FIG. 2 illustrates an embodiment of a method for controlling product information according to the present disclosure. FIG. 2 shows a distributor 230 providing controlled product information to a reseller 250 and a potential purchaser 270, by using various program embodiments, as described herein. The elements in FIG. 2 are shown in an illustrative conceptual arrangement and are not intended to limit the scope of the present disclosure to any particular relationship between the physical locations of the elements.

The distributor 230 offers a number of products for sale to one or more resellers, including the reseller 250. The distributor 230 can be a business or an individual. The distributor 230 can manufacture the products that it offers or it can obtain these products from one or more other sources, such as manufacturers, wholesalers, and other distributors. The distributor 230 can be associated with one or more distributor locations, such as a warehouse or distribution center.

The reseller 250 offers one or more of the distributor's products for resale to one or more potential purchasers, including the potential purchaser 270. The reseller 250 can be a business or an individual. The reseller 250 can be another distributor, a wholesaler, or a vendor. The reseller 250 can be associated with one or more reseller locations, such as a retail location or a design studio.

The potential purchaser 270 may potentially purchase one or more of the distributor's products 233 offered for resale by the reseller 250. The potential purchaser 270 can be a business or an individual. The potential purchaser 270 can be another distributor, a wholesaler, another reseller, a vendor, or an end user. The potential purchaser 270 can be associated with one or more potential purchaser locations, such as a home or a business.

The distributor 230 can store product information 236, reseller information, and various program instructions, in electronic form on a computing device, e.g., a server 235, associated with the distributor 230. For ease of reference, program embodiments are described in relation to being stored and executed on a server. Embodiments, however, are not limited to this server example. In FIG. 2, the server 235 is shown as a single server, however, in various embodiments, functions of the server 235 can be performed by one or more computing devices networked together, as described in connection with FIG. 1. The product information 236 can include various information about products offered by the distributor 230, such as product names, descriptions, numbers, pictures, prices, product availability, etc. The reseller information can include various information associated with the reseller 250, such as custom brand information, private label information, reseller account levels, various price control inputs, various selections to reseller account levels, etc.

Program instructions on the server 235 can execute to use the product information 236 to provide controlled product information based on a control input, which can be received from the reseller 250. The control input is operable to control the product information 236. The control input can be one or more instructions, received electronically or otherwise, from the reseller 250 regarding the display of the product information 236. Various control inputs can control various aspects of product information. A control input can be used to control one or more particular types of information in the product information. As an example, a price control input is operable to control price information in the product information.

For example, program instructions can execute to provide product information that includes a product name, product description, and a product price. Program instructions can also execute, in this example, to receive from the reseller 250 a price control input to remove price information. Additionally, in various embodiments, program instructions can execute to apply the price control input to the product information to provide controlled product information that includes the product name and the product description but not the product price. A viewable interface showing embodiments for receiving such price control inputs is provided in FIG. 7.

Program instructions on the server 235 can also execute to use the product information 236 to provide controlled product information based on a selection to a reseller account level (described further in connection with FIGS. 5 and 6), which can be received from the reseller 250. The selection, which can be one or more instructions, received electronically or otherwise, can control the display of the product information 236.

For example, program instructions can execute to provide product information that includes product names, product descriptions, and product availabilities. In various embodiments, program instructions can execute to receive a selection to a reseller account level for a particular date. Program instructions can execute, in various embodiments, to display products with availabilities within that particular date and to exclude from display other products with availabilities outside of that particular date. A system illustrating embodiments of account levels for receiving such selections is provided in FIG. 5.

In various embodiments, program instructions on the server 235 can execute to control product information, based on receipt of one or more price control inputs and/or reseller account level selections. Program instructions can execute to display "controlled product information" based on receipt of one or more price control inputs and/or reseller account level selections. As used herein, "controlled product information" implies product information that has been operated on by the program embodiments described herein, e.g., according to at least one control input and/or reseller account level selection. Program instructions can execute to provide controlled product information through the Internet and/or through other electronic media, including computer readable media such as floppy disks, CD-ROMs, flash memory, flash drives, etc. Embodiments are not limited to these examples.

The reseller 250 can use another computing device 255, connected to the server 235 via the Internet or other connectivity, with program instructions that can execute to access and display controlled product information, such as controlled product information from the server 235. The reseller 250 can also use the computing device 255 and a printer to produce a printed copy 256 of the controlled product information. The reseller 250 can then provide the printed copy 256 to the potential purchaser 270 at a particular reseller location or can send the printed copy 256 to the potential purchaser 270 at various other locations.

Program instructions associated with the display of controlled product information can execute to receive a price control input and/or a reseller account level selection, which can be received, for example, from the reseller 250. Program instructions can also execute to provide a price control input and/or a reseller account level selection through the Internet 245 or through various other electronic media, to the distributor's server 235. In various embodiments, a price control input and/or reseller account level selection can also be provided to the server 235 as instructions on a disk, by inputs from the distributor 230 in response to verbal communications from the reseller 250, or through other communications.

The potential purchaser 270 can also use a computing device 275, connected to the server 235 via the Internet or other connectivity, with program instructions that can execute to access and display controlled product information, such as controlled product information from the server 235. For example, the potential purchaser can use a particular login, which gains access to a website, where program instructions associated with the website operate to make accessible the display of controlled product information. In this way, the potential purchaser 270 can view displays of controlled product information on the computing device 275 at various potential purchaser locations.

In the embodiment of FIG. 2, although the potential purchaser 270 can view displays of controlled product information, the controlled product information is still based on a price control input and/or a reseller account level selection received from the reseller 250. The potential purchaser 270 can also use the computing device 275 and a printer to produce a printed copy 276 of the controlled product information. Embodiments of these displays of controlled product information are described in connection with FIGS. 3-8.

FIGS. 3-8 illustrate various controls and displays of controlled product information according to the embodiments described herein. FIGS. 3-4C and 6-8 are viewable interfaces displaying controlled product information according to the present disclosure. As the reader will appreciate, the various viewable interfaces can be presented in various embodiments as one or more web pages, as part of a virtual showroom. Program instructions can execute to provide particular content, as described herein, to the viewable interfaces of a virtual product showroom, such as the example virtual product showroom. Embodiments, however, are not limited to this form of display. The viewable interfaces of FIGS. 3-4C and 6-8 illustrate embodiments of an example virtual product showroom for lighting products. However, embodiments of the present invention can be used with various products, and are not limited to limited to lighting products, or any other particular products.

Program instructions can execute to provide a virtual product showroom in various embodiments as one or more web pages associated with an Internet website, e.g., screens displayed from a stand-alone device, such as a computer, or screens displayed through other electronic media. Program instructions can also execute to allow a user, such as a reseller or a potential purchaser, to navigate through a virtual product showroom in various ways, such as by performing product searches, by browsing through various screens, or by selecting particular products.

Embodiments of the control and display of controlled product information according to the present disclosure can be performed by software, firmware, hardware, application modules, and the like. These embodiments can use program instructions resident on and/or executable by ASICs, devices, systems, or networks shown herein or otherwise. The embodiments of the control and display of controlled product information are not limited to any particular operating environment or to instructions written in any particular programming language. Software, firmware, and/or processing modules, suitable for carrying out embodiments of the control and display of controlled product information, can be resident on one or more devices or in one or more locations.

The viewable interfaces in FIGS. 3-4C and 6-8 associated with embodiments of the control and display of controlled product information include example products, example information and example selections for an example distributor and an example reseller. The example products are offered for sale by the example distributor to the example reseller and offered for resale by the example reseller to an example potential purchaser, as described in connection with FIG. 2. These examples are included for illustrative purposes and are not intended to limit the scope of the present disclosure to any particular product, information, selection, distributor, or reseller. Throughout FIGS. 3-8, references to the distributor, the reseller, the potential purchaser, and the virtual product showroom are used as the terms will be recognized by one of ordinary skill in the art, unless otherwise indicated.

Figure 3:
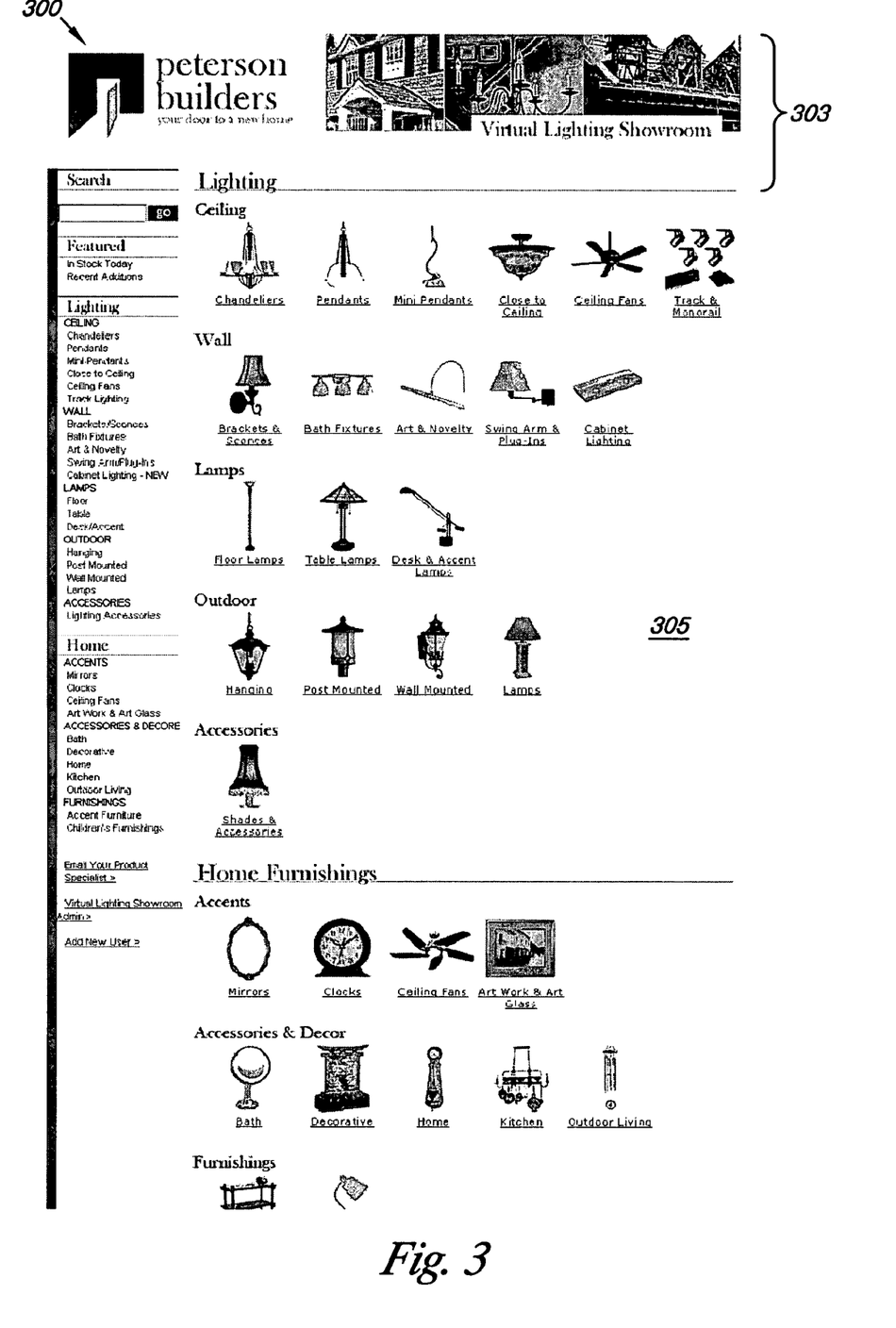
FIGS. 3 is a viewable interface illustrating an embodiment of controlled product information according to the present disclosure.

FIGS. 3 is a viewable interface illustrating an embodiment of controlled product information according to the present disclosure. The viewable interface can be provided to a reseller, according to the program instructions described herein. As shown in FIG. 3, program instructions can execute to display a viewable interface 300, which shows a header 303 and product information 305. Program embodiments are provided such that instructions execute to receive particular reseller information about a given reseller and can execute to display that information in a form of private labeling viewable to the reseller and/or to one or more potential purchasers. Additionally, program instructions execute such that the product information 305 displayed contains controlled product information about products from the distributor offered for resale by the reseller to one or more potential purchasers.

As illustrated in the embodiment of FIG. 3, the header 303 contains custom brand information. The custom brand information includes a name of the reseller, a logo of the reseller, an advertising tagline of the reseller, pictures, and a title. The header 303 can also contain private labeling for a particular reseller, such as a private label name, logo, graphic, etc. Program instructions can execute to display the header 303 with custom brand information and/or private labeling. Starting from the viewable interface 300, a user can navigate through the controlled product information, e.g., like a virtual product showroom, to screens with product information for particular products, as described in connection with FIGS. 4A-4C.

Figure 4A:
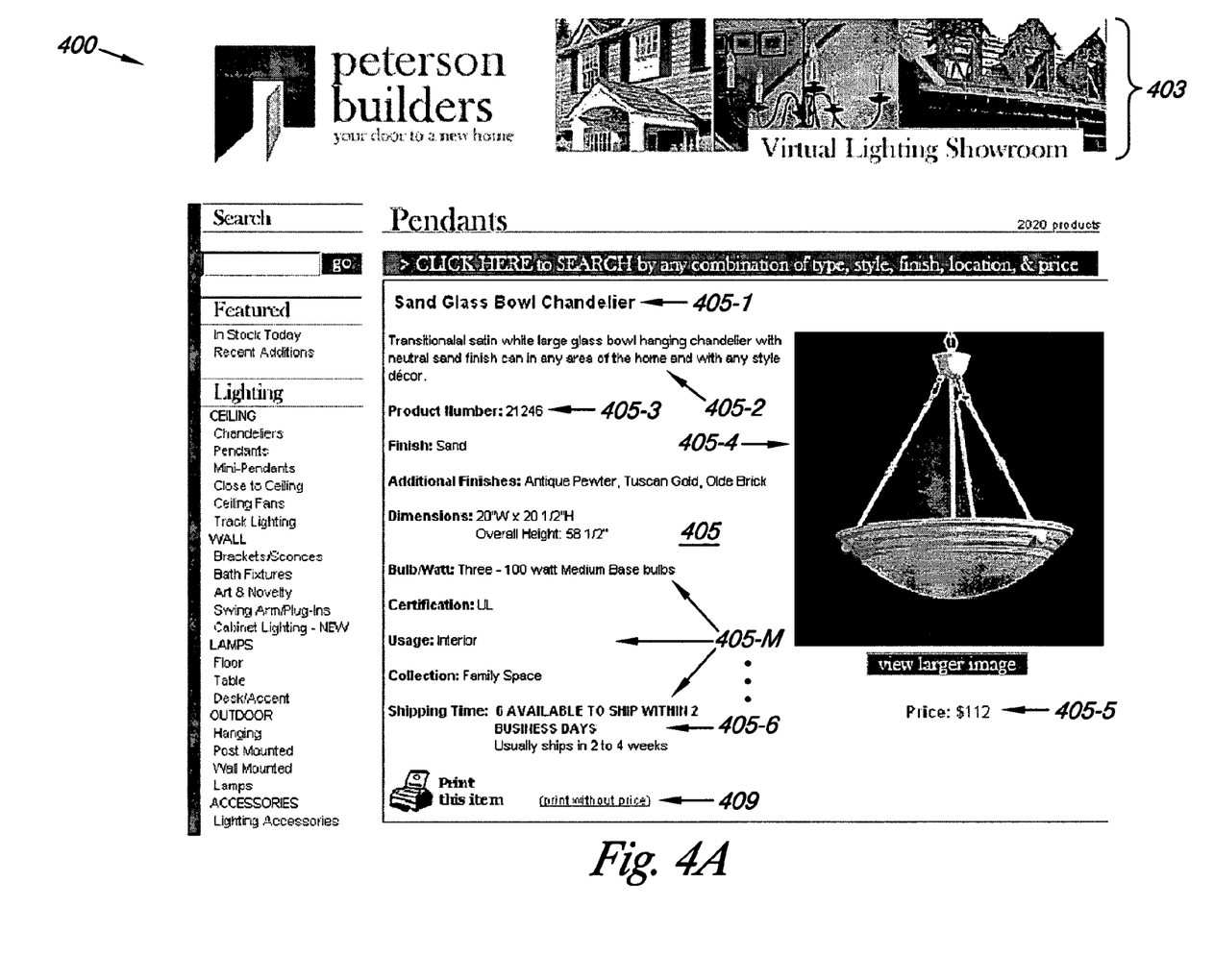
FIGS. 4A-4C are viewable interfaces illustrating embodiments of controlled product information according to the present disclosure.
Figure 4B:
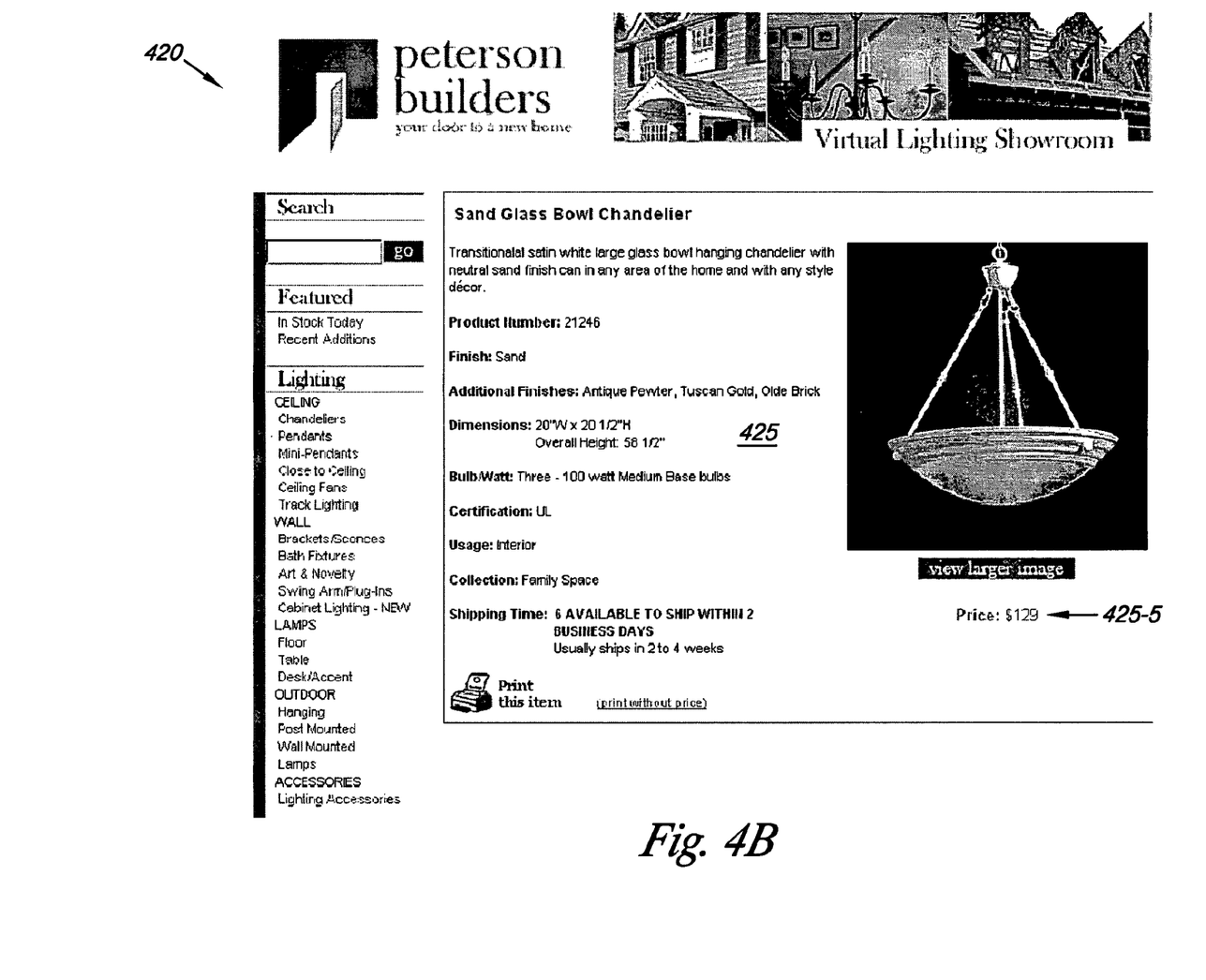
Figure 4C:
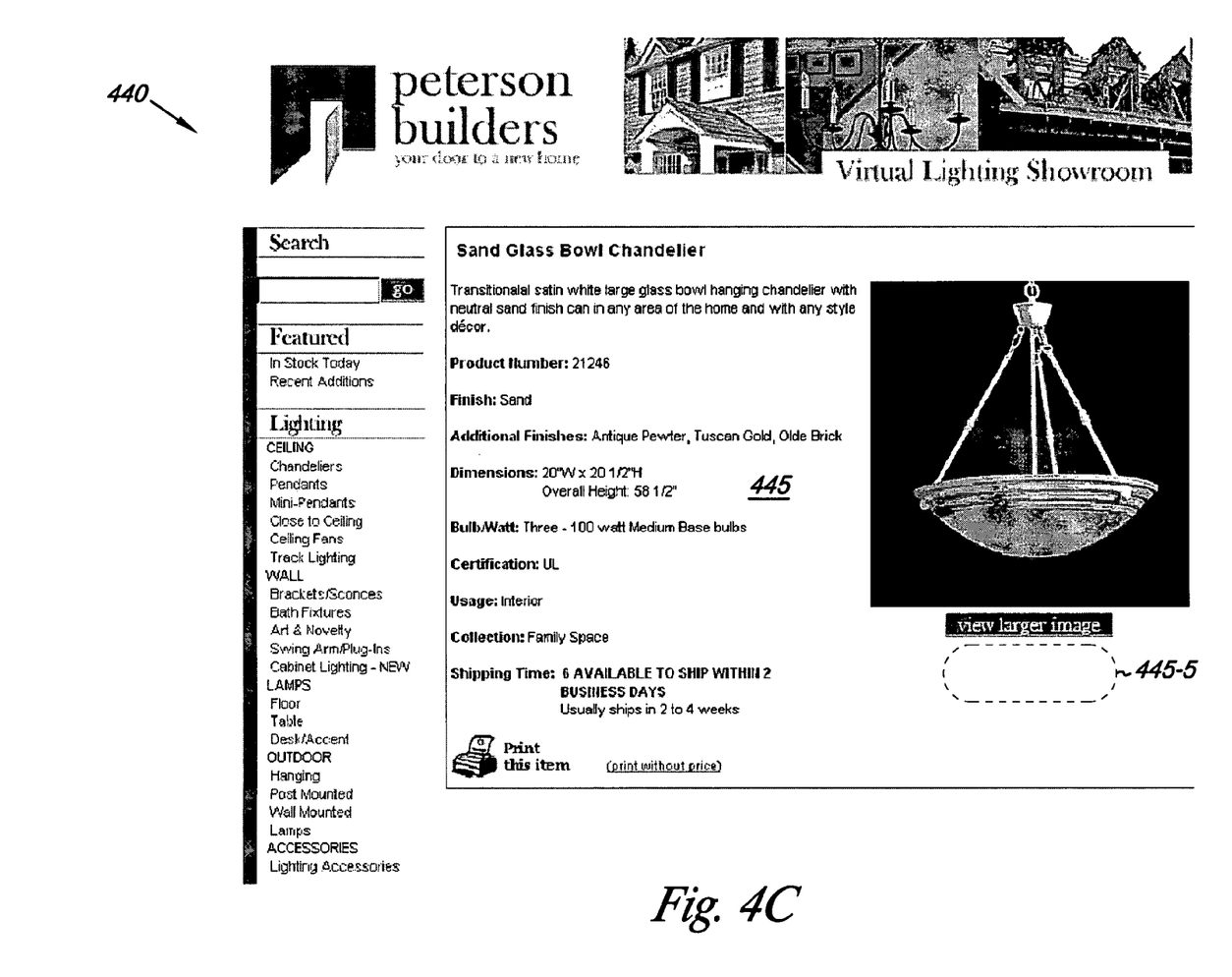

FIGS. 4A-4C are viewable interfaces illustrating embodiments of controlled product information according to the present disclosure. FIGS. 4A-4C illustrate controlled product information in the form of a virtual product showroom according to the present disclosure. Embodiments, however, are not limited to viewable interfaces in the form of a virtual product showroom. The viewable interfaces of FIGS. 4A-4C illustrate different example scenarios for displaying controlled product information based on various price control inputs received from the reseller. As will be described in connection with FIGS. 7 and 8, the program instructions execute to provide a reseller with a field to enter one or more particular price control inputs.

FIG. 4A illustrates a viewable interface 400 in an example scenario. In this embodiment, program instructions have executed based on one or more price control inputs to display controlled product information. The viewable interface 400 shows a header 403, product information 405, and print options 409. The header 403 is the same as the header 303 of FIG. 3, containing information about the reseller. As illustrated the product information 405 includes types of product information 405-1, 405-2, . . . , 405-M. The designator "M" is intended to represent that the product information 405 can include a number of types of product information. In the embodiment of FIG. 4A, the types of product information include a product name 405-1, a product description 405-2, a product number 405-3, a product picture 405-4, price information 405-5, a product availability 405-6, and other types of product information 405-M.

As shown in FIG. 4A, the product name 405-1 is sand glass bowl chandelier, the product description 405 is a one sentence description of the sand glass bowl chandelier, and the product number 405-3 as 21246. The product picture 405-4 is shown as an image of the sand glass bowl chandelier. The price information 405-4 includes a price of $112, as described below. The product availability 405-6 shows six sand glass bowl chandeliers available to ship within two business days. In the embodiments of FIGS. 4A-4C, the product information 405 is in an unbranded format. That is, the product information 405 is displayed so that it does not identify a manufacturer of the product or the distributor.

Program instructions can execute to display the viewable interface 400 based on one or more price control input received from the reseller. In this example scenario, the product, e.g., sand glass bowl chandelier, may be offered by the distributor for sale to the reseller at a price of $86. In the embodiment of FIG. 4A, program instructions operate to receive a price control input entered by the reseller (described in connection with FIGS. 7 and 8), to display price information with a particular reseller markup when displaying the product information. In this example scenario the particular reseller markup may be expressed as a percentage of the distributor's price, e.g., 1.30 (not shown). Program instructions can execute to calculate a price to display by multiplying the distributor price by the particular reseller markup. In other words, program instructions can execute to multiply the distributor price of $86 by the reseller markup of 1.30 to yield a price of $112, which may be offered by the reseller for resale to the potential purchaser. Program instructions can also execute to display this calculated price as part of the viewable interface 400. That is, in the embodiment of FIG. 4A, the calculated price of $112 is displayed on the viewable interface 400 as the price information 405-5.

The print options 409 provide another mechanism for the reseller to control product information provided to a potential purchaser. The print options 409 include print this item and print without price. When the reseller selects the print option 409 to print this item, program instructions can execute to print the viewable interface 400 as shown in FIG. 4A. When the reseller selects the print option 409 to print without price, program instructions can execute to print a modified version of the viewable interface 400 with price information 405-5 removed and not displayed on a printed copy. The reseller can then provide the printed copy with the controlled product information to the potential purchaser.

FIG. 4B illustrates a viewable interface 420 in a different example scenario. In FIG. 4B, the viewable interface 420 displays controlled product information for the particular product, e.g., sand glass bowl chandelier, based on a different price control input received from the reseller. That is, in the example embodiment of FIG. 4B, a scenario is illustrated based on a price control input to display price information with a particular reseller markup of 1.50 when displaying product information. The viewable interface 420 shows a header, and product information 425, which includes price information 425-5. The product information 425 is unbranded and can include the same types of product information as shown in FIG. 4A, e.g., a product name, a product description, a product number, a product picture, the price information 425-5, a product availability, and other types of product information. However, the price information 425-5 differs from the price information 405-5. In other words, in this embodiment program instructions have executed based on one or more price control inputs to display controlled product information.

In this example scenario, the program instructions execute to display the viewable interface 420 based on a different price control input received from the reseller. To illustrate, it is again presumed that in this scenario the product is being offered by the distributor for sale to the reseller at a price of $86. In the embodiment of FIG. 4B, program instructions operate to receive a price control input entered by the reseller, to display the price information 425-5 with a different particular reseller markup when displaying the product information 425. In this example scenario the particular reseller markup can be a different percentage particular reseller markup of the distributor's price (, e.g., 1.50 compared to 1.30 in FIG. 4A). The program instructions operate to receive the price control input entered by the reseller, to display the price information 425-5 with the different particular reseller markup of 1.50 when displaying the product information 425. In other words, program instructions can execute to multiply the distributor price of $86 by the particular reseller markup of 1.50 to yield a price of $129. In the embodiment of FIG. 4B, the calculated price of $129 is displayed on the viewable interface 420 as the price information 425-5.

In FIG. 4C, a viewable interface 440 illustrates another different example scenario. In FIG. 4C, the viewable interface 440 displays controlled product information for the particular product, e.g., sand glass bowl chandelier, based on another different price control input received from the reseller to remove price information when displaying product information. The viewable interface 440 shows a header, and product information 445, which includes a price field 445-5 for displaying price information. The product information 445 is unbranded and can include the same types of product information as shown in FIG. 4A, e.g., a product name, a product description, a product number, a product picture, a product availability, and other types of product information. However, in this embodiment the program instructions have executed, based on the other different price control input, such that the product information 445 does not include price information. Thus, as illustrated in FIG. 4C the price field 445-5 is empty. That is the program instructions have executed based on one or more price control inputs to display the product information 445 without displaying price information in the price field 445-5.

Program instructions can execute to display the viewable interface 440 based on a price control input received from the reseller. To illustrate, it is again presumed that in this scenario the product is being offered by the distributor to the reseller for a particular price. In the embodiment of FIG. 4C, the program instructions operate to receive a price control input entered by the reseller. However, in the embodiment of FIG. 4C, program instructions operate to receive a price control input entered by the reseller which operates to remove price information when displaying the product information. Thus, as shown in FIG. 4C, the program instructions have executed to remove price information from the product information 445. In addition to price control inputs, program instructions can also execute to display controlled product information based on reseller account level selections, as described in connection with FIGS. 5-8.

Figure 5:
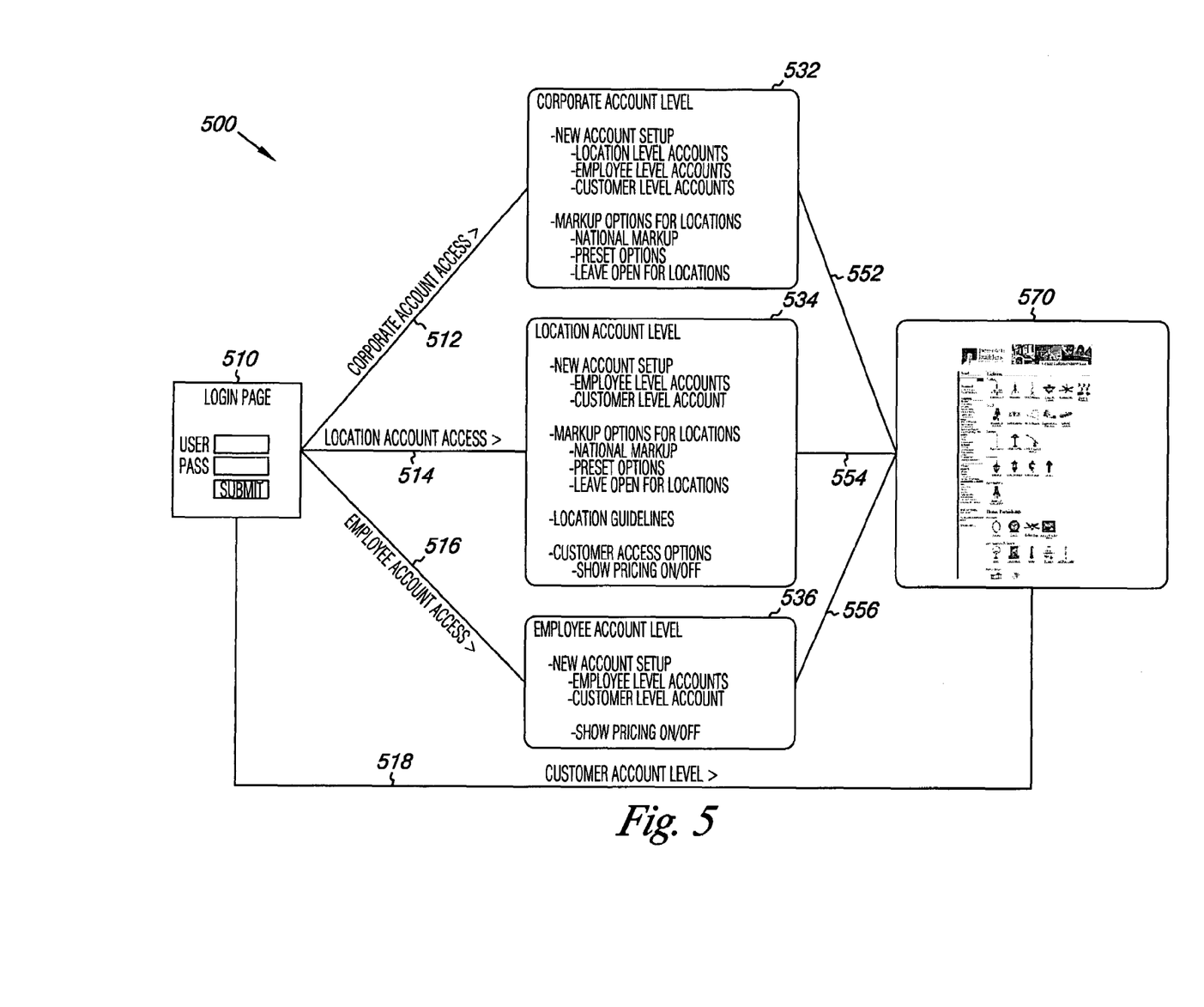
FIG. 5 illustrates a system with connectivity to accommodate various hierarchal control over product information according to the present disclosure.

FIG. 5 illustrates a system 500 with connectivity to accommodate various hierarchal control over product information, i.e., embodiments of account levels for controlling product information according to the present disclosure. The system 500 shows access to a viewable interface 510 for logins of various account levels. For example, the viewable interface can be a webpage accessible over the Internet to provide login information. Embodiments, however, are not limited to a webpage for login access, e.g., a login page can be part of an organization's intranet, etc. Program instructions can execute to receive particular login information from a user at the viewable interface 510 and provide control of and/or access to controlled product information through another viewable interface 570, e.g., in the form of a virtual product showroom, that corresponds with the particular login information.

Program instructions can execute to accept logins of various account levels at the viewable interface 510. In the embodiment shown in FIG. 5, program instructions execute to provide access to the viewable interface 570 based upon input provided to various account levels. According to embodiments, each account level has various degrees of access, administration, and control. In the example embodiment of FIG. 5, four account levels are shown. However, in various embodiments, more or fewer account levels can be provided. In the FIG. 5 example embodiment, program instructions associated with the viewable interface 570 execute in response to corporate login information to provide corporate account access 512 to a reseller corporate account level 532, as well as corporate level access 552 to the viewable interface 570. Program instructions associated with the viewable interface 570 also execute in response to location login information to provide location account access 514 to one or more reseller location account levels 534 as well as location level access 554 to the viewable interface 570. Program instructions associated with the viewable interface 570 further execute in response to employee login information to provide employee account access 516 to one or more reseller employee account levels 536 as well as employee level access 556 to the viewable interface 570.

Program instructions associated with the viewable interface 570 further execute in response to customer login information to provide customer account access to one or more customer account levels 518. A customer account level can be used by a potential purchaser. In various embodiments, a customer account level does not provide for account administration or control of the controlled product information displayed in the viewable interface 570. However, program instructions for a customer account level execute to provide customer level access to the viewable interface 570 for a potential purchaser to view displays of controlled product information in the viewable interface 570.

Each of the reseller account levels, 532, 534, and 534 shown in FIG. 5 can perform certain account administration tasks for the viewable interface 570 by executing various program instructions, as described herein. Program instructions can execute to perform account administration tasks of viewing, editing, adding, or deleting accounts. In the embodiment of FIG. 5, program instructions associated with the reseller corporate account level 532 can execute to provide corporate account administration such as the ability to view, edit, add, or delete reseller location account levels, reseller employee account levels, and customer account levels. According to various embodiments, program instructions associated with the reseller location account level 532 and/or the reseller employee account level 536 can execute to provide location account administration such as the ability to view, edit, add, or delete various reseller employee account levels and customer account levels. Thus, the system 500 illustrates a hierarchy of account level administration. In the embodiment of FIG. 5, program instructions execute so that a corporate account level 532 can administer location accounts levels 534, location account levels 534 can administer employee account levels 536, employee account levels 536 can administer customer accounts levels 518, and customer account levels 518 cannot administer other account levels.

Program instructions can also execute so that each of the reseller account levels, 532, 534, and 534 shown in FIG. 5 can also control how product information is shown in the viewable interface 570 based on various selections to one or more reseller account levels. Program instructions can execute to show controlled product information in the viewable interface 570 in response to these selections, as described in connection with FIG. 2.

In the embodiment of FIG. 5, program instructions can execute to receive various selection options to each reseller account level, for control of the controlled product information in the viewable interface 570. For the reseller corporate account level 532, program instructions can execute to provide various selection options, including an option to select a national reseller markup, an option to select preset reseller markups, and an option to select leaving pricing open for reseller locations. For the reseller location account level 534, program instructions can also execute to provide various selection options, including an option to select a national reseller markup, an option to select preset reseller markups, an option to select leaving pricing open for reseller locations, and an option to select whether or not product prices are shown for a customer account level. For the reseller employee account level 536, program instructions can also execute to provide selection options to select whether or not product prices are shown for a customer account level 518.

Each of the reseller account levels, 532, 534, and 534 shown in FIG. 5 can also receive one or more selections for a particular subset of product information for products displayed in the viewable interface 570, by executing various program instructions, as described herein. In various embodiments, program instructions can execute so that these reseller account levels can receive one or more selections for a particular type of product information, a particular type of product, or a particular date. Program instructions can execute to show controlled product information in the viewable interface 570, in response to these selections.

For example, if a reseller account level receives a selection for product pictures, then program instructions can execute so that the viewable interface 570 shows product pictures for various products and excludes other types of product information from being shown, based on that selection for product pictures as a particular type of product information.

As a further example, if a reseller account level receives a selection for chandeliers, then program instructions can execute so that the viewable interface 570 shows chandelier products (e.g. a sand glass bowl chandelier, as described in connection with FIGS. 4A-4C) and excludes other types of products from being shown, based on that selection for chandeliers as a particular type of product.

As an additional example, if a reseller account level receives a selection for a particular date, then program instructions can execute so that the viewable interface 570 shows products with availabilities within that particular date and can exclude other products with availabilities outside of that particular date, based on that selection for a particular date. A viewable interface showing an embodiment of reseller account levels is provided in FIG. 6.

Figure 6:
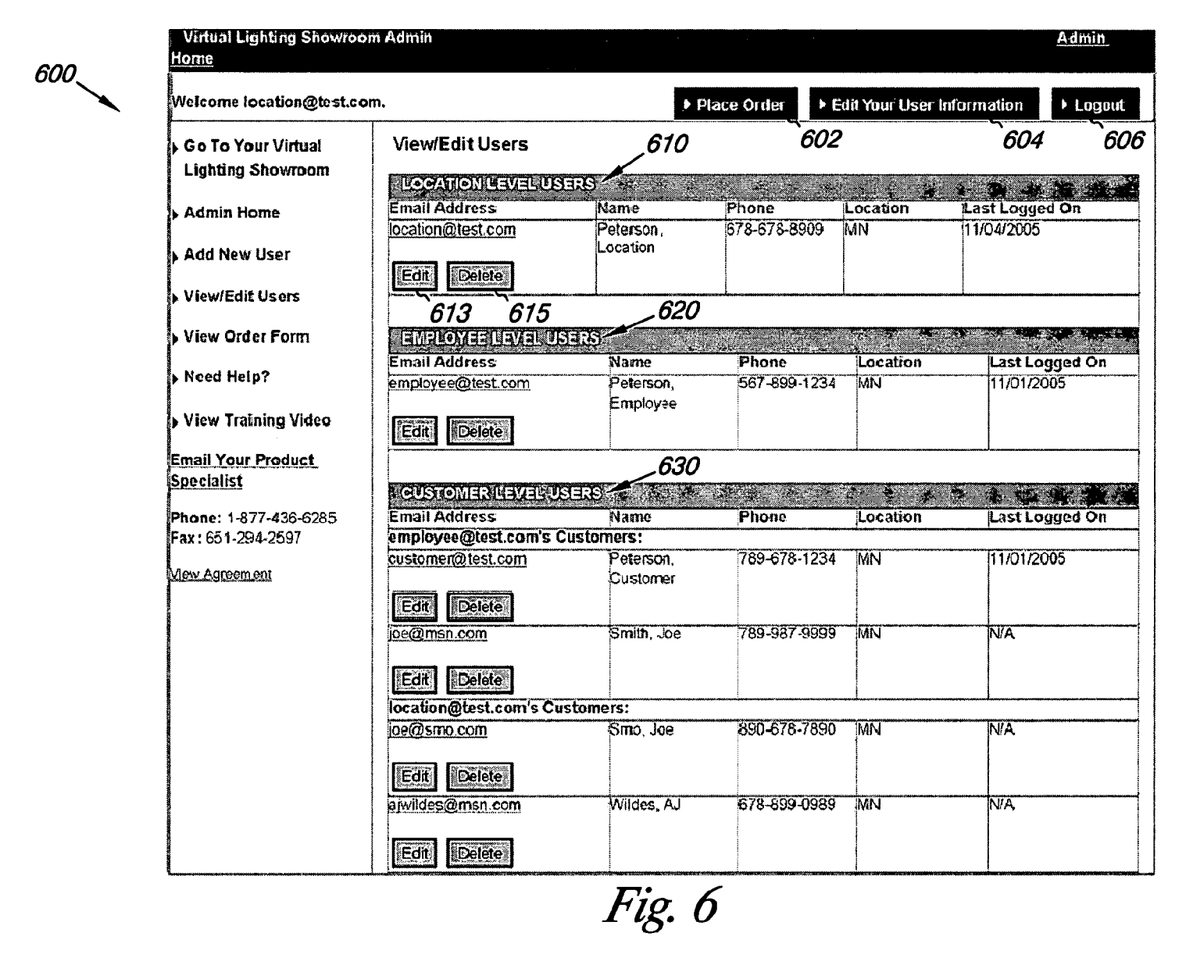
FIG. 6 is an embodiment of account levels for controlling product information according to the present disclosure.

FIG. 6 is an embodiment of account levels for controlling product information according to the present disclosure. Program instructions execute to display a viewable interface 600 that shows a view associated with a reseller corporate account level, as described in connection with FIG. 5. Program instructions can also execute to show various options for a user of the reseller corporate level. The viewable interface 600 shows options for the user to place an order 602 for a product from the viewable interface, to edit user information 604 associated with the reseller corporate account level, and to logout 606 of the reseller corporate account level. Program instructions can execute to respond to a user selection for each of these options and further execute to perform one or more tasks associated with each selection.

Program instructions also execute for the viewable interface 600 to show account administration options for users of a reseller location account level 610, users of a reseller employee account level 620, and users of a customer account level 630, as described in connection with FIG. 5. In the embodiment of FIG. 6, program instructions execute to provide account administration options to edit 613 and delete 615 users listed under the reseller location account level 610. Program instructions can execute to provide an edit option and a delete option for each of the other users listed. Program instructions can execute to respond to a user selection of an edit option or a delete option by editing user information or deleting a user in response to the selection. Program instructions for the reseller corporate account level can also execute to provide price control inputs for controlling product information in the viewable interface, as described in connection with FIG. 7.

Figure 7:
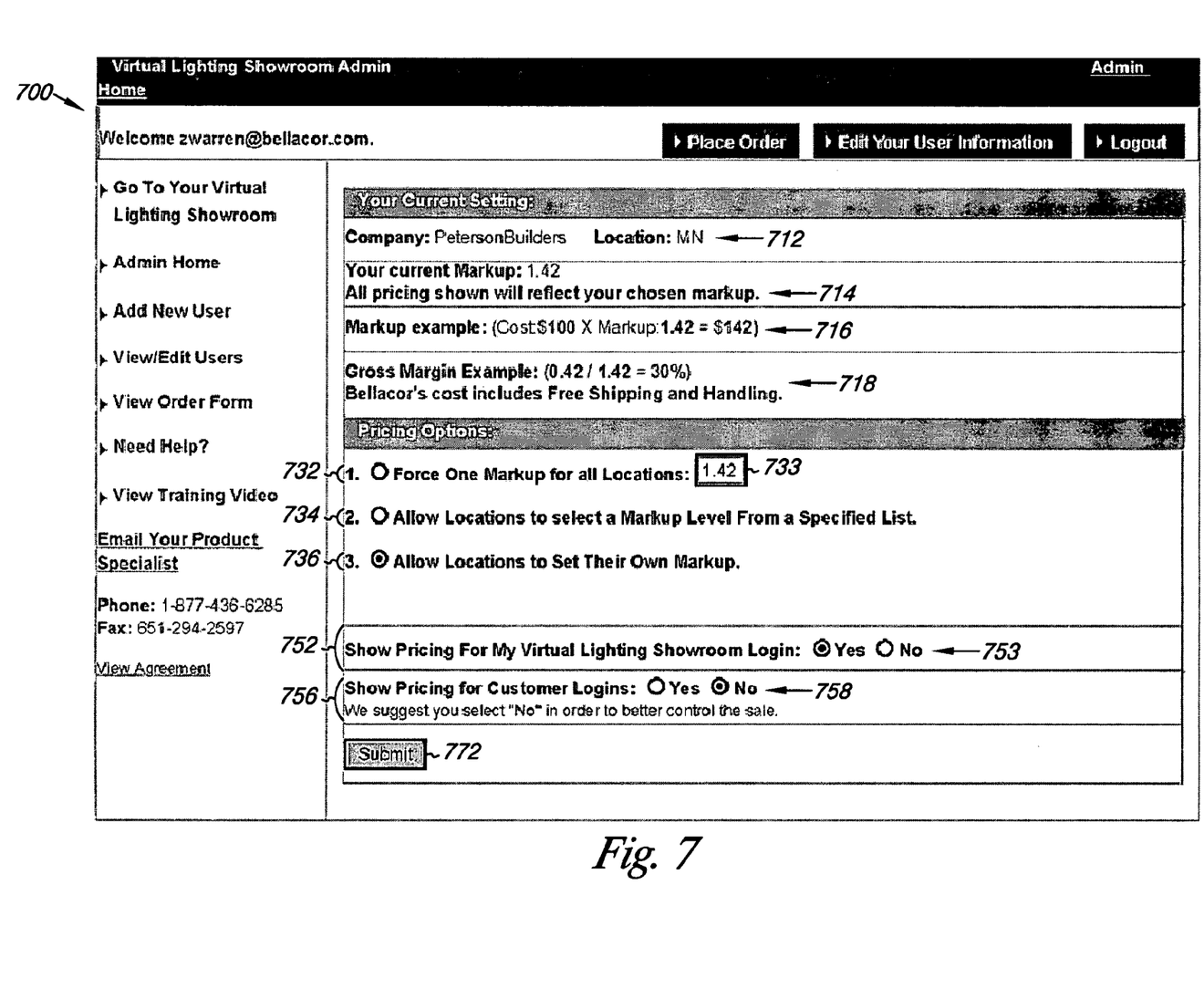
FIG. 7 is a viewable interface illustrating an embodiment of control inputs for controlling product information according to the present disclosure.

FIG. 7 is a viewable interface illustrating an embodiment of control inputs for controlling product information according to the present disclosure. Program instructions execute to display a viewable interface 700 that displays information about the reseller and price control inputs, which can be selected by the reseller.

In FIG. 7, program instructions can execute to display various information about the reseller and the reseller's currently selected price control inputs. Program instructions execute to display the viewable interface 700 that displays a view from a reseller corporate account level, as described in connection with FIG. 5. Program instructions also execute to display reseller information 712, which includes a company name and location of the reseller. Program instructions further execute to display current reseller markup information 714, which includes a markup currently selected by the reseller. The current reseller markup information 714 in FIG. 7 displays a currently selected reseller markup of 1.42, which represents a 42% increase over the reseller purchase price, at which the distributor would offer products for sale to the reseller.

Program instructions execute to display an illustrative price calculation 716, which reflects the reseller purchase price multiplied by the currently selected reseller markup. The result of the illustrative price calculation 716 equals a potential purchaser price at which the reseller would offer an example product for sale to the potential purchaser. The illustrative price calculation 716 in FIG. 7 displays a reseller purchase price of $100 multiplied by the currently selected reseller markup of 1.42, which equals a potential purchaser price of $142.

Program instructions additionally execute to display a sample gross margin calculation 718, which includes the currently selected reseller markup minus one, all divided by the currently selected reseller markup. The result of the sample gross margin calculation 718 equals a sample gross margin that a reseller would realize for sales by the reseller at the currently selected reseller markup. The example sample gross margin calculation 718 in FIG. 7 displays the currently selected reseller markup of 1.42 minus 1.00, which is 0.42, divided by the currently selected reseller markup of 1.42, which equals a sample gross margin for the reseller of 30%.

In FIG. 7, program instructions can execute to display various reseller price control inputs, which can be selected by the reseller. A first price control input 732 in FIG. 7 is a price control input to display price information with a particular reseller markup selected for all reseller locations. Program instructions can execute to receive a particular reseller markup from a reseller markup field 733. As shown in FIG. 7, the reseller has currently entered a particular reseller markup of 1.42 in the reseller markup field 733. When the reseller selects the first price control input 732, program instructions can execute to display a particular reseller markup from the reseller markup field 733 for all reseller locations, when displaying controlled product information, such as shown in FIGS. 4A-4C. For example, if the reseller selects the first price control input 732 with a particular reseller markup of 1.42 in the reseller markup field 733, then program instructions can execute to display price information for prices of 1.42 times the reseller's purchase prices, when displaying controlled product information to a potential purchaser.

In various embodiments, program instructions can execute to receive a particular reseller markup in various forms from the reseller. The reseller markup of 1.42 as shown in the reseller markup field 733 is a particular percentage reseller markup. However, program instructions can also execute to receive a particular reseller markup in the form of a particular fixed currency reseller markup from the reseller markup field 733. Embodiments are not so limited. For example, if the reseller selects the first price control input 732 with a particular fixed currency reseller markup of $10 in the reseller markup field 733, then program instructions can execute to display price information for prices of $10 more than the reseller's purchase prices, when displaying controlled product information to a potential purchaser. Program instructions can also execute to receive particular reseller markups in other forms, as understood by one of ordinary skill in the art.

Additionally, program instructions can also execute to receive a particular price control input to display price information that yields a particular reseller margin. For example, if the reseller selects a price control input to display price information that yields a particular reseller margin of 30%, then program instructions can execute to display price information for prices that are marked up to over the reseller purchase price to yield the reseller margin of 30% when displaying controlled product information to a potential purchaser.

A second price control input 734 in FIG. 7 is a price control input to display price information with a particular reseller markup selected from a set of preset reseller markups. When the reseller selects the second price control input 734, program instructions can execute to display price information with a particular reseller markup selected by a reseller location account level from a set of preset reseller markups provided by a corporate reseller account level, when displaying the product information. A corporate reseller account level can provide these preset reseller markups, as described in connection with FIG. 8. For example, a corporate reseller account level may provide preset reseller markups of 1.3, 1.4, and 1.5, from which each reseller location account level can select a particular reseller markup for each corresponding particular reseller location.

A third price control input 736 in FIG. 7 is a price control input to display price information with a number of different particular reseller markups selected for a number of different particular reseller locations. When the reseller selects the third price control input 736, program instructions can execute to display price information with a particular reseller markup freely selected by a reseller location account level, when displaying the product information. For example, a first reseller location account level may freely select a particular reseller markup of 1.35 for a first corresponding particular reseller location and a second reseller location account level may freely select a particular reseller markup of 1.45 for a second corresponding particular reseller location.

A fourth price control input 752 in FIG. 7 is a price control input to remove price information when displaying controlled product information for a particular reseller account level. Program instructions can execute to receive a selection 753 of yes or no, for displaying price information for that particular reseller account level. When a user of a particular reseller account level selects yes from the selection 753, program instructions can execute to display price information for products when that particular reseller account level accesses the viewable interface. When a user of a particular reseller account level selects no from the selection 753, program instructions can execute to remove price information from displays of product information when that particular reseller account level accesses the viewable interface. For example, a user of a reseller location account level may select yes or no from the selection 753, depending on how the user wishes to display controlled product information to a potential purchaser viewing the viewable interface from that user's reseller account level access.

A fifth price control input 756 in FIG. 7 is a price control input to remove price information when displaying controlled product information for a particular customer account administered by a particular reseller account level. Program instructions can execute to receive a selection 758 of yes or no, for displaying price information for that particular customer account. When a user of the particular reseller account level selects yes from the selection 758, program instructions can execute to display price information for products when a user of that particular customer account logs-in for access to the viewable interface. When a user of the particular reseller account level selects no from the selection 758, program instructions can execute to remove price information from displays of product information when a user of that particular customer account logs-in for access to the viewable interface. For example, a user of a reseller location account level may select yes or no from the selection 758, depending on how the user wishes to display controlled product information to a potential purchaser viewing the viewable interface from customer account level access. Program instructions can execute to display controlled product information, based on selected price control inputs, when a user selects a submit option 772.

Figure 8:
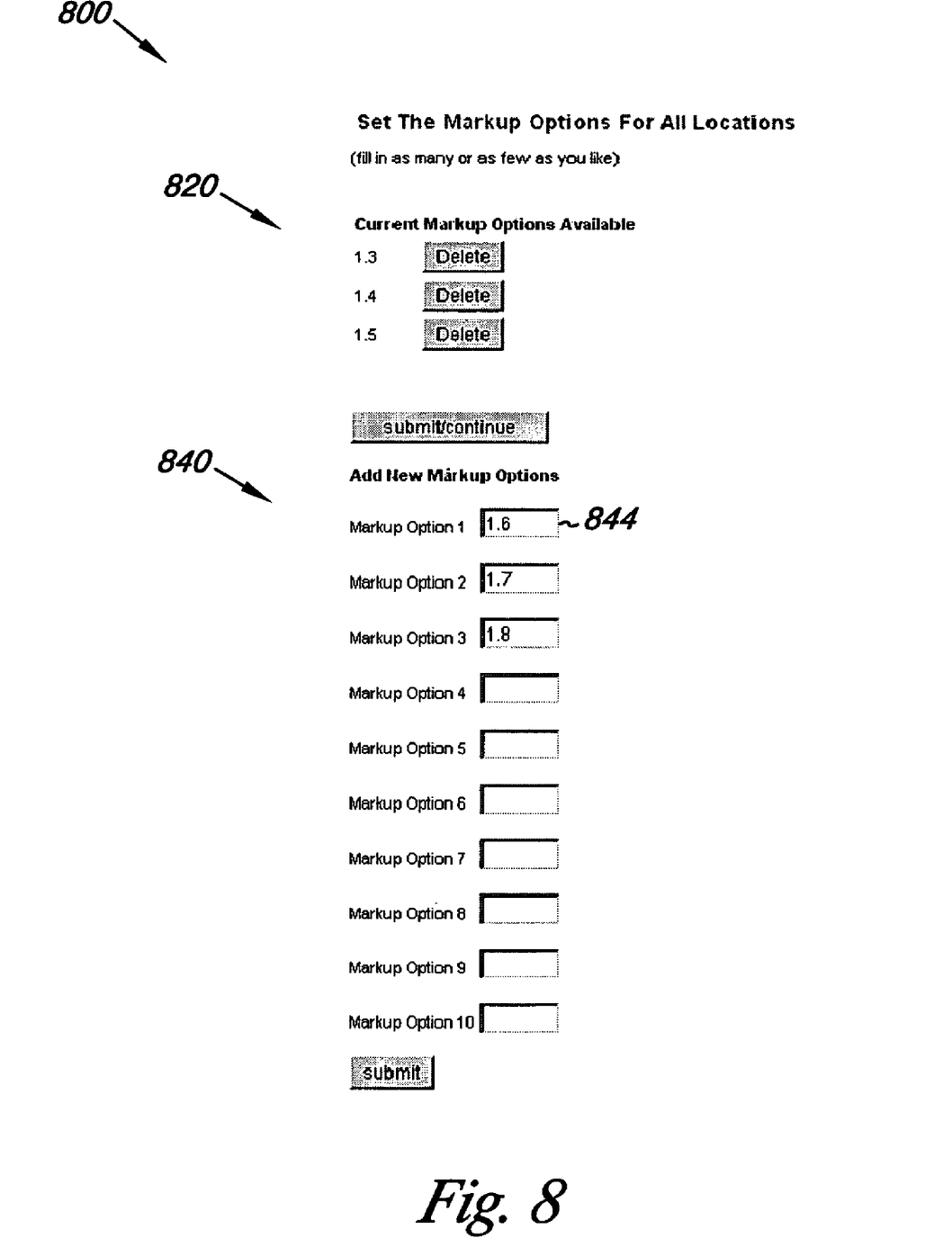
FIG. 8 is a viewable interface illustrating another embodiment of control inputs for controlling product information according to the present disclosure.

FIG. 8 is a viewable interface illustrating another embodiment of control inputs for controlling product information according to the present disclosure. Program instructions execute to display a viewable interface 800 as a view from a reseller corporate account level, as described in connection with FIGS. 5 and 7. The viewable interface 800 displays current preset reseller markup options 820 available to reseller locations account levels and a number of new preset reseller markup options 840. Program instructions can execute to provide current preset reseller markup options 820 to reseller location account levels, when a user of the reseller corporate account level selects the second price control input 734, as described in connection with FIG. 7.

Program instructions also execute to display the viewable interface 800 with an option for a user to delete particular preset reseller markup options from the current preset reseller markup options 820 and an option for a user to submit changes to preset reseller markup options. The viewable interface 800 further includes markup fields 844, which can be used to add new preset reseller markup options and an option to submit the new preset reseller markup options.

Various numbers of preset reseller markup options can be used. Program instructions can execute to respond to changes to the preset reseller markup options, by updating price information for controlled product information displayed in one or more viewable interfaces, such as those of a virtual product showroom.

Although specific embodiments have been illustrated and described herein, those of ordinary skill in the art will appreciate that an arrangement calculated to achieve the same techniques can be substituted for the specific embodiments shown. This disclosure is intended to cover all adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that embodiments of the present disclosure require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computer readable storage medium having instructions stored thereon and executable to cause a device to perform a method, comprising:

providing a private labeled virtual product showroom, which contains a number of products offered by a distributor and private labeling from a reseller;

providing a number of reseller account levels to the reseller, wherein each reseller account level can control how product information about the number of products is shown, in the virtual product showroom;

showing product information about the number of products in the virtual product showroom, based on a selection to a reseller account level;

wherein the method includes providing the number of account levels, including: a number of reseller location account levels, each of which can control how product information about the number of products is shown in the virtual product showroom at a particular reseller location; and a reseller corporate account level, which can control how product information about the number of products is shown in the virtual product showroom at all reseller locations, using the reseller corporate account level to select a number of preset Markups;

using a particular reseller location account level from among the number of reseller location account levels to select a particular preset markup from among the number of preset markups; and showing product information in the virtual product showroom with the particular preset markup at a particular reseller location associated with the particular reseller location account level.

2. The medium of claim 1, wherein the method includes:
receiving a selection for a particular type of product information to a reseller account level; and
showing only product information that corresponds with the particular type of product information, based on the selection.

3. The medium of claim 1, wherein the method includes:
receiving a selection for a particular type of product to a reseller account level; and
showing product information for the particular type of product from among the number of products, based on the selection.

4. The medium of claim 3, wherein the method includes:
receiving a selection for a particular date to a reseller account level; and
showing the product information for the particular type of product on the particular date, based on the selection.

5. The medium of claim 1, wherein the method includes:
using the reseller corporate account level to select a particular markup for all locations; and
showing product information in the virtual product showroom with the particular markup at all reseller locations.

6. The medium of claim 1, wherein the method includes:
using the reseller corporate account level to select an allowance for reseller location account levels to select their own markups;
using a particular reseller location account level from among the number of reseller location account levels to select a particular markup; and
showing product information in the virtual product showroom with the particular markup at a particular reseller location associated with the particular reseller location account level 7. A method comprising:
providing a private labeled virtual product showroom, which contains a number of products offered by a distributor and private labeling from a reseller;
providing a number of reseller account levels to the reseller, wherein each reseller account level can control how product information about the number of products is shown, in the virtual product showroom;
showing product information about the number of products in the virtual product showroom, based on a selection to a reseller account level;
wherein the method includes providing the number of account levels, including:
a number of reseller location account levels, each of which can control how product information about the number of products is shown in the virtual product showroom at a particular reseller location; and
a reseller corporate account level, which can control how product information about the number of products is shown in the virtual product showroom at all reseller locations,
using the reseller corporate account level to select a number of preset markups;
using a particular reseller location account level from among the number of reseller location account levels to select a particular preset markup from among the number of preset markups; and
showing product information in the virtual product showroom with the particular preset markup at a particular reseller location associated with the particular reseller location account level.

8. A system comprising:
a processor;
a memory, connected to the processor; and program instructions storable in the memory and executable by the processor to:
provide a private labeled virtual product showroom, which contains a number of products offered by a distributor how private labeling from a reseller;
provide a number of reseller account levels to the reseller, wherein each reseller account level can control how product information about the number of products is shown in the virtual product showroom;
show product information about the number of products in the virtual product showroom, based on a selection to a reseller account level;
providing the number of account levels, including:
a number of reseller location account levels, each of which can control how product information about the number of products is shown in the virtual product showroom at a particular reseller location; and
a reseller corporate account level, which can control how product information about the number of products is shown in the virtual product showroom at all reseller locations,
using the reseller corporate account level to select a number of preset Markups;
using a particular reseller location account level from among the number of reseller location account levels to select a particular preset markup from among the number of preset markups; and
showing product information in the virtual product showroom with the particular preset markup at a particular reseller location associated with the particular reseller location account level.

* * * * *